US012741581B2

(12) United States Patent
Contreras Sosa et al.

(10) Patent No.: US 12,741,581 B2
(45) Date of Patent: Sep. 22, 2026

(54) RETRACTABLE FENDER MEMBER TIE DOWN

(71) Applicant: Ford Global Technologies, LLC, Dearborn, MI (US)

(72) Inventors: Mario Contreras Sosa, Naucalpan (MX); Luis Angel Becerril Cruz, Toluca (MX); Enrique Emanuel Farias, Cuautitlan Izcalli (MX); Martin D. Lopez, Oakland, MI (US); Paul Jonathan Alexander Wraith, West Bloomfield, MI (US); Daniel J. Kangas, Livonia, MI (US); Brian Grover, Warren, MI (US); Diego Santillan Gutierrez, Tizayuca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 609 days.

(21) Appl. No.: 17/941,160

(22) Filed: Sep. 9, 2022

(65) Prior Publication Data

US 2024/0083336 A1 Mar. 14, 2024

(51) Int. Cl.
*B60P 7/08* (2006.01)
*B60R 9/00* (2006.01)

(52) U.S. Cl.
CPC .............. *B60P 7/0807* (2013.01); *B60R 9/00* (2013.01)

(58) Field of Classification Search
CPC ......... B60P 7/0807; B60P 7/06; B60P 7/0815; B61D 45/001; B62D 33/037; B62D 33/03; B66C 1/36; F16B 13/0808; Y10T 24/2175; Y10T 24/4773
USPC ........................................................ 410/110
See application file for complete search history.

(56) References Cited

U.S. PATENT DOCUMENTS

| | | | | |
|---|---|---|---|---|
| 3,709,156 A * | 1/1973 | Bowers | B63B 25/28 | 410/111 |
| 3,814,461 A * | 6/1974 | Rhody | B60R 9/048 | 410/108 |
| 4,072,113 A * | 2/1978 | Thurston | F16B 45/051 | 24/601.6 |
| 4,108,342 A * | 8/1978 | Riva | B60P 7/0807 | 224/571 |
| 4,257,570 A * | 3/1981 | Rasmussen | B60P 7/0807 | 248/503 |
| 4,288,188 A | 9/1981 | Smith | | |
| 4,531,869 A * | 7/1985 | Hemmings | B60P 7/0807 | 410/107 |
| 4,741,653 A * | 5/1988 | Schmidt | B60P 7/0807 | 410/112 |
| 4,883,208 A * | 11/1989 | Bott | B60R 9/06 | 410/112 |
| 6,637,992 B1 * | 10/2003 | Chang | B60P 7/0807 | 410/107 |

(Continued)

FOREIGN PATENT DOCUMENTS

| | | |
|---|---|---|
| CN | 214928772 U | 11/2021 |
| WO | 2016159786 A1 | 10/2016 |

*Primary Examiner* — Amy R Weisberg
*Assistant Examiner* — Philip C Adams
(74) *Attorney, Agent, or Firm* — Vichit Chea; Carlson, Gaskey & Olds, P.C.

(57) ABSTRACT

An apparatus includes at least one fender member supported by a vehicle and a tie down member associated with the at least one fender member. The tie down member is movable between a use position and a stowed position.

22 Claims, 4 Drawing Sheets

(56) References Cited

U.S. PATENT DOCUMENTS

| | | | | |
|---|---|---|---|---|
| 7,131,387 | B1 | 11/2006 | Czipri | |
| 10,759,330 | B1* | 9/2020 | Salter | B60Q 1/28 |
| 10,800,340 | B1 | 10/2020 | Mayville et al. | |
| 10,870,453 | B2* | 12/2020 | Elder | B60R 9/052 |
| 11,135,963 | B1 | 10/2021 | Goebel | |
| 2004/0228699 | A1* | 11/2004 | Venton-Walters | B61D 45/001 410/109 |
| 2011/0068137 | A1 | 3/2011 | Murray et al. | |
| 2012/0055967 | A1 | 3/2012 | McMillan | |
| 2013/0105535 | A1 | 5/2013 | Berrey | |
| 2014/0109283 | A1 | 4/2014 | Burgess, Jr. | |
| 2014/0131405 | A1 | 5/2014 | Noonan | |
| 2016/0311478 | A1 | 10/2016 | Amiri | |
| 2017/0355297 | A1* | 12/2017 | Chimenti | B60P 7/0807 |
| 2018/0281659 | A1 | 10/2018 | Stojkovic et al. | |
| 2019/0063024 | A1 | 2/2019 | Levin | |
| 2020/0172209 | A1 | 6/2020 | Eva | |
| 2020/0369196 | A1* | 11/2020 | McKimson | B60P 7/0807 |
| 2020/0377025 | A1* | 12/2020 | Salter | B60Q 1/0023 |
| 2022/0242213 | A1* | 8/2022 | Bartz | B60K 26/02 |

* cited by examiner

RETRACTABLE FENDER MEMBER TIE DOWN

TECHNICAL FIELD

This disclosure relates generally to a fender tie down and, more particularly, to a tie down that is retractable within a fender member.

BACKGROUND

Vehicles transport various types of cargo. A user can, for example, use the vehicle to transport large items such as kayaks, canoes, ladders, surfboards, etc. These items are often tied to a top of a vehicle or within a cargo area of a vehicle using tie downs. For example, ropes or straps are placed over the items and are then tied to bumpers at the front and/or rear of the vehicle. These ropes and straps can rub against paint on the vehicle.

SUMMARY

In some aspects, the techniques described herein relate to an apparatus, including: at least one fender member supported by a vehicle; and a tie down member associated with the at least one fender member, wherein the tie down member is movable between a use position and a stowed position.

In some aspects, the techniques described herein relate to an apparatus, which further includes at least one resilient member to bias the tie down member to the stowed position.

In some aspects, the techniques described herein relate to an apparatus, which further includes at least one bracket that attaches the tie down member to an internal vehicle mount structure.

In some aspects, the techniques described herein relate to an apparatus, wherein the internal vehicle mount structure is within an engine compartment.

In some aspects, the techniques described herein relate to an apparatus, wherein the at least one bracket comprises at least a first bracket that is fixed to the internal vehicle mount structure and a second bracket that is attached to the first bracket at a first attachment interface and to the tie down member at a second attachment interface.

In some aspects, the techniques described herein relate to an apparatus, wherein the first attachment interface and the second attachment interface are independent of each other.

In some aspects, the techniques described herein relate to an apparatus, wherein the first attachment interface comprises a fixed interface and the second attachment interface comprises a pivot attachment interface.

In some aspects, the techniques described herein relate to an apparatus, wherein the fender member comprises a housing having a flange surrounding a recessed area that receives the at least one tie down member, and wherein the flange fits against an exterior surface of the vehicle, and wherein a wall portion, which defines the recessed area, extends inward into a vehicle internal area.

In some aspects, the techniques described herein relate to an apparatus, which further includes at least one bracket that couples the tie down member to a fixed structure within the vehicle internal area, and wherein the at least one bracket has a first end that is pivotally connected to the tie down member within the recessed area and a second end that protrudes outwardly of the housing and into the vehicle internal area.

In some aspects, the techniques described herein relate to an apparatus, wherein the tie down member comprises a handle body having at least one open area forming a loop portion that is configured to receive a tie member used to attach an item to the vehicle.

In some aspects, the techniques described herein relate to an apparatus, wherein the fender member comprises a fender vent.

In some aspects, the techniques described herein relate to a method, including: providing at least one fender member on a vehicle; and associating a tie down member with the at least one fender member such that the tie down member is movable between a use position and a stowed position.

In some aspects, the techniques described herein relate to a method, which further includes biasing the tie down member to the stowed position.

In some aspects, the techniques described herein relate to a method, which further includes overcoming a biasing force to move the tie down member to the use position.

In some aspects, the techniques described herein relate to a method, which further includes tying a tie member to a loop portion of the tie down member to secure an item to the vehicle.

In some aspects, the techniques described herein relate to a method, which further includes providing at least one bracket to fix the tie down member to the vehicle, the at least one bracket having one end fixed to an internal vehicle structure and an opposite end pivotally connected to the tie down member.

In some aspects, the techniques described herein relate to a method, including: fixing at least a first bracket to a mount structure within a vehicle internal area; pivotally coupling a tie down member to a second bracket to form a sub-assembly; inserting the sub-assembly into a recessed area of a fender member such that the tie down member is configured to face an external environment and one end of the second bracket protrudes outwardly of the fender member; and fitting the fender member against a vehicle external surface that surrounds a fender member opening with the one end of the second bracket extending through the fender member opening to connect to the first bracket.

In some aspects, the techniques described herein relate to a method, wherein the vehicle internal area comprises an engine compartment.

In some aspects, the techniques described herein relate to a method, which further includes biasing the tie down member to a stowed position via a resilient interface between the tie down member and the second bracket.

In some aspects, the techniques described herein relate to a method, wherein all fasteners associated with the first bracket and the second bracket are located within the vehicle internal area such that the vehicle external surface is free from fasteners at a respective fender member location.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a fender tie down and, more particularly, a tie down that is movable within a fender between a stowed position and a deployed position to hold down an item on a vehicle.

Figure 1:
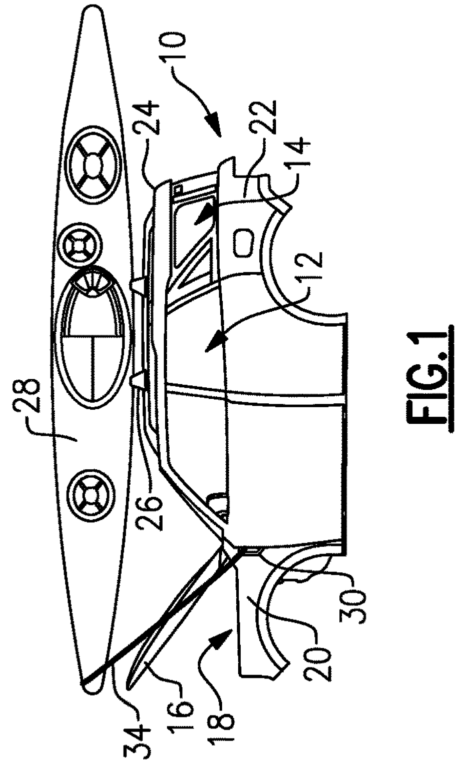
FIG. 1 illustrates a side view of a vehicle with a fender tie down according to the disclosure.

With reference to FIG. 1, a vehicle 10 includes a passenger compartment 12 and a rear cargo area 14. A hood 16 is movable between an open position and a closed position to provide access to an engine compartment 18. The vehicle 10 includes front fenders 20, rear fenders 22, and a top cover 24. A mounting system 26 is used to secure items 28 to the vehicle 10. In one example, the mounting system 26 comprises a rack. The items 28 can comprise a kayak, canoe, ladder, surfboard, tool box, etc.

In one example, the front fender 20 includes a fender member 30 such as a fender vent, fender badge, fender side plastic component, or fender molding. FIG. 1 shows an example of a fender vent 30; however, any of the other fender members could also be included on the vehicle. Only one fender vent 30 is shown in FIG. 1; however, it should be understood that the opposite side of the vehicle 10 would also include a fender vent 30. The rear fenders 22 could also include fender vents 30. The subject disclosure provides at least one of the fender members 30 with a tie down member 32 (FIGS. 2A-2B) that is used to tie down the item 28. The tie down members 32 are configured to receive a tying member 34 such that the item 28 can be securely held in place while the vehicle 10 is driving. Examples of a tie member or a tying member include ropes, straps, cords, cables, etc. Further, as discussed above, while FIG. 1 shows an example of the tie down member 32 being associated with a fend vent, the tie down could also be associated with any one of a fender badge, fender side plastic component, or fender molding.

Figure 2B:
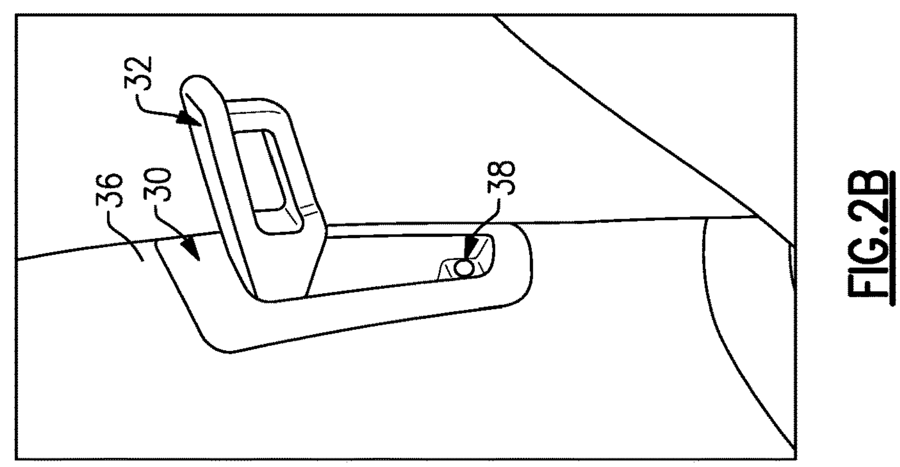
FIG. 2B shows the tie down of FIG. 2A in a deployed or use position.
Figure 2A:
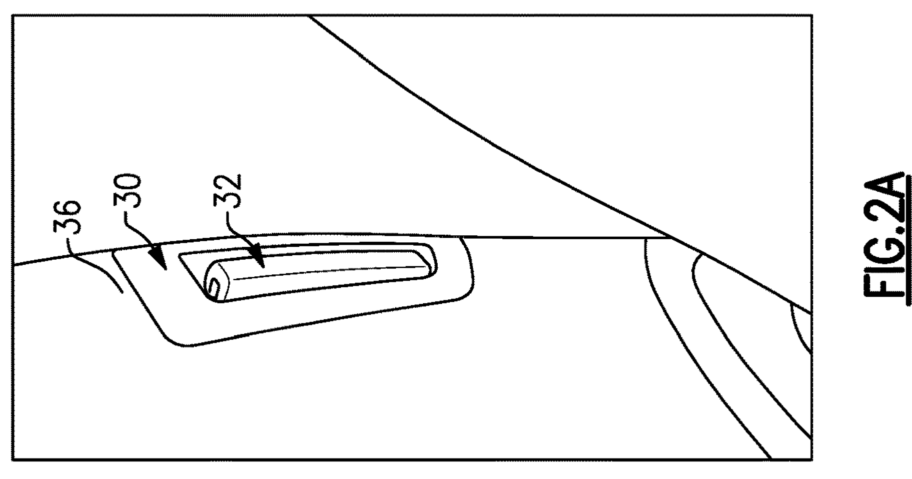
FIG. 2A shows a tie down in a stowed or retracted position within a fender vent.

The tie down member 32 is a retractable member such that the tie down member 32 can move between a retracted/stowed position and a deployed/use position. FIG. 2A shows the tie down member 32 in a stowed position. In this position, the tie down member 32 is generally flush with a vehicle exterior surface 36 such that the tie down member 32 does not protrude outwardly of the fender vent 30. FIG. 2B shows the tie down member 32 in the deployed position where the tie down member 32 protrudes outwardly of the vehicle exterior surface 36 to interact with the tying member 34.

In one example shown in FIG. 2B, a magnet 38 can be used to hold the tie down member 32 in the stowed position. The magnet 38, for example, could be molded within plastic material used to form the fender vent 30, and the tie down member can be formed from a metal material.

Figure 3:
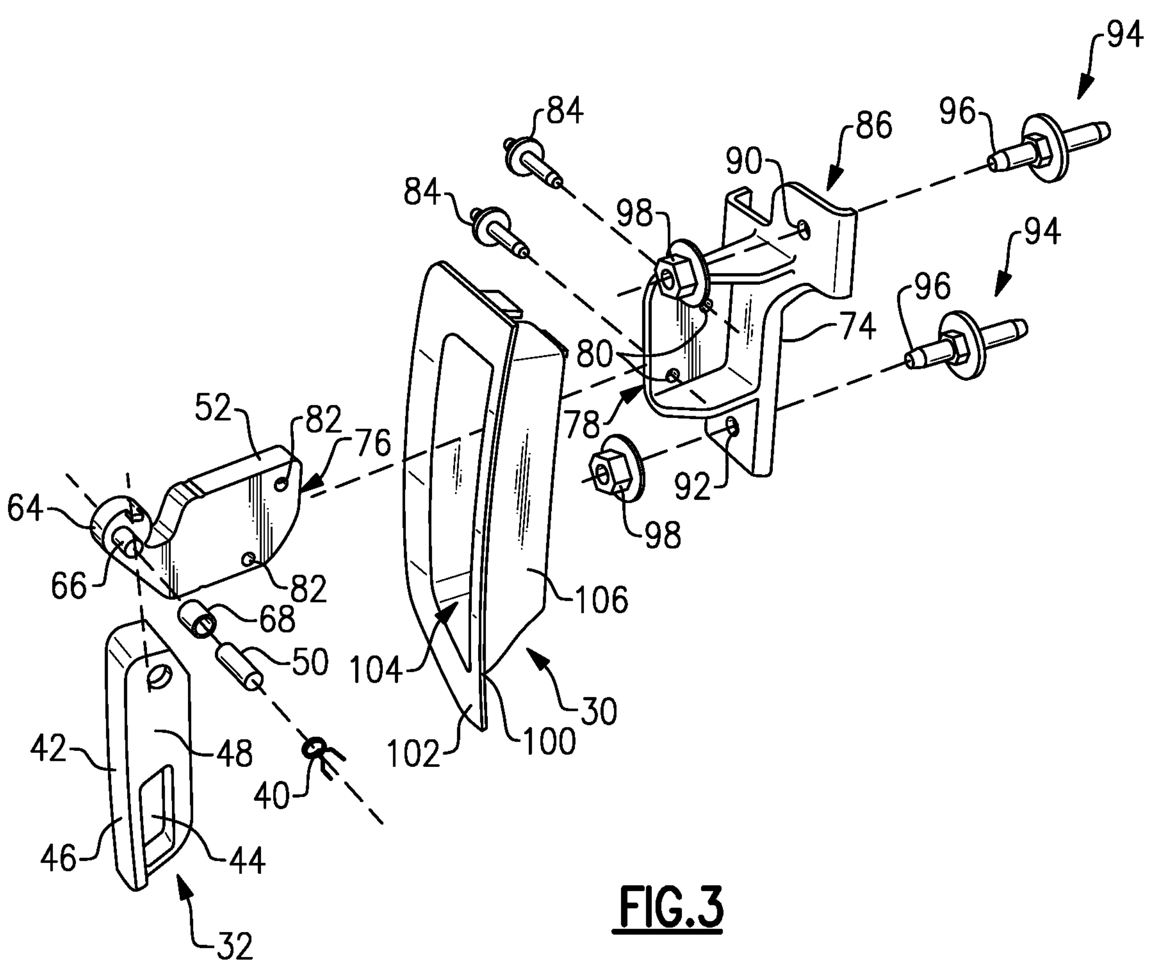
FIG. 3 shows an exploded view of one example of a fender vent tie down according to the disclosure.

FIG. 3 shows another example where the tie down member 32 is resiliently biased into the stowed position. In one example, a resilient member 40, such as a spring for example, is installed to hold the tie down member 32 in the stowed position. This provides an aesthetically pleasing appearance, as well as keeping the tie down member 32 from snagging or bumping into other structures when not in use.

In one example, the tie down member 32 comprises a handle body 42 having at least one open area 44 forming a loop portion 46 that is configured to receive the tie member 34 that is used to attach the item 28 to the vehicle 10. The handle body 42 also includes a solid portion 48 at one end that is pivotally connected to the vehicle 10 via a pin 50, with the loop portion 46 being formed at an opposite end of the handle body 42.

Figure 5:
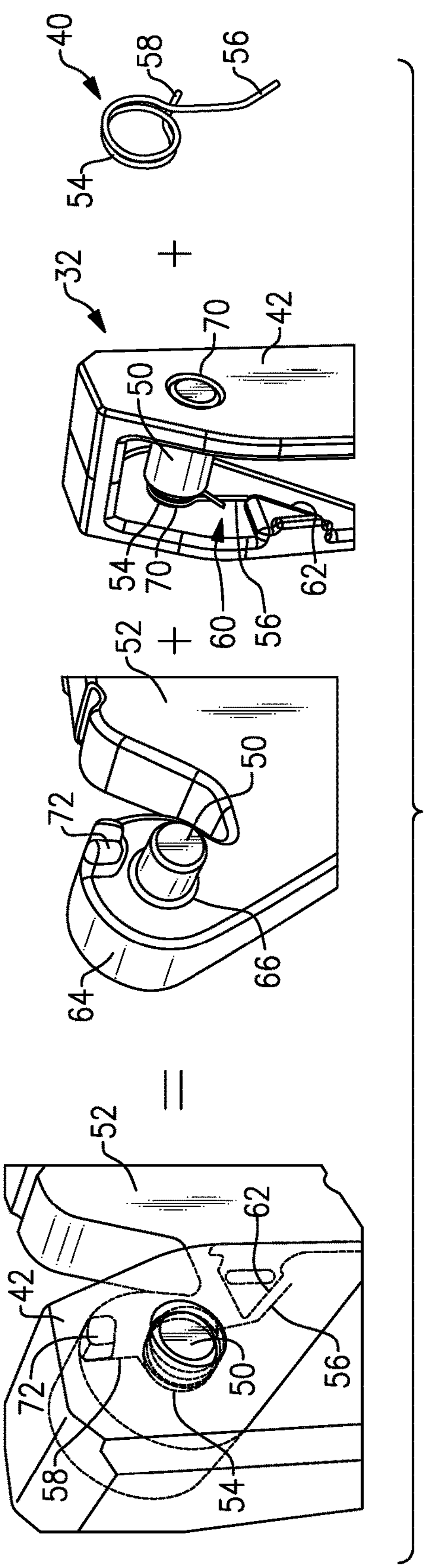
FIG. 5 is a magnified view of a portion of a tie down and bracket from FIGS. 4A-B and associated steps performed to provide a sub-assembly.

As shown in FIG. 5, the resilient member 40 reacts between the handle body 42 and a bracket 52. In this example, the resilient member 40 comprises a coil spring body 54 having a first spring end 56 and a second spring end 58. The handle body 42 includes a recessed area 60 that receives the spring body 54 and the pin 50. The recessed area 60 includes an abutment ledge 62 for the first spring end 56. The bracket 52 includes an arm 64 with an opening 66 that receives a bearing 68 (FIG. 3) within which the pin 50 is mounted. The handle body 42 includes a pair of openings 70 on opposing sides of the recessed area 60. The arm 64 extends into the recessed area 60 such that the openings 70 are aligned with the opening 66 in the bracket arm 64 to receive the pin 50. The bracket arm 64 includes an abutment ledge 72 for the second spring end 58.

Figure 4B:
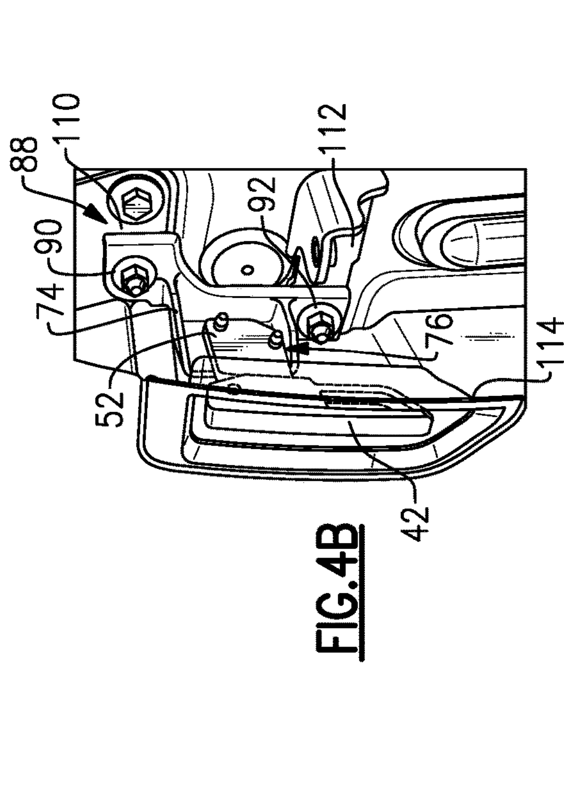
FIG. 4B is a partial section view of the tie down in the stowed position.
Figure 4A:
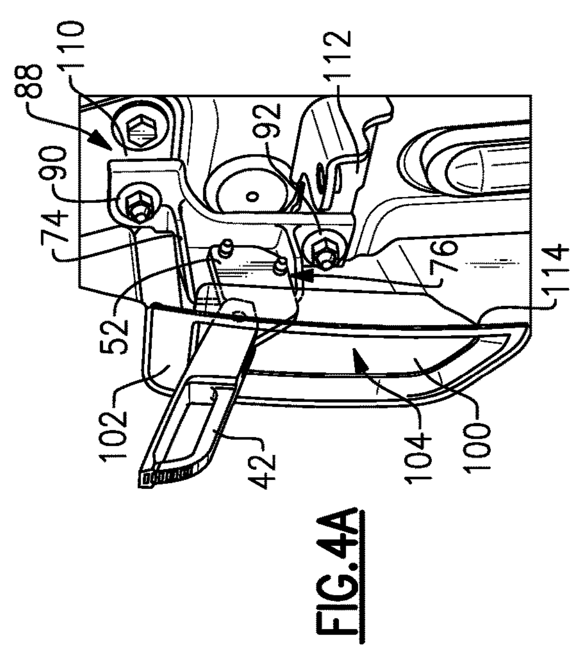
FIG. 4A is a partial section view of the tie down in the deployed position.

The disclosure provides at least one bracket that is used to attach the tie down member 32 to an internal vehicle mount structure. In one example, the at least one bracket comprises the bracket 52 to which the handle body 42 is pivotally coupled, as well as at least one additional bracket 74 (FIG. 3) that is fixed to the internal vehicle mount structure. The arm 64 of the first bracket 52 comprises a pivotal attachment interface via the pin 50 to the handle body 42, and the first bracket 52 also includes a second attachment interface 76 that is independent of the pivotal attachment interface. The second attachment interface 76 cooperates with an attachment interface 78 on the additional bracket 74. In one example, the attachment interface 78 includes one or more openings 80 that align with corresponding openings 82 in the second attachment interface 76 of the first bracket 52. When the openings 80, 82 are aligned with each other, fasteners 84 are inserted through the openings 80, 82 to secure the two brackets 52, 74 together. The additional bracket 74 includes another attachment interface 86 that secures to an internal mount structure 88 (FIGS. 4A-4B). In one example, the attachment interface comprises a first opening 90 and a second opening 92 that receive fasteners 94. In one example, the fasteners 94 comprise a double ended bolt 96 with a nut 98.

Figure 6:
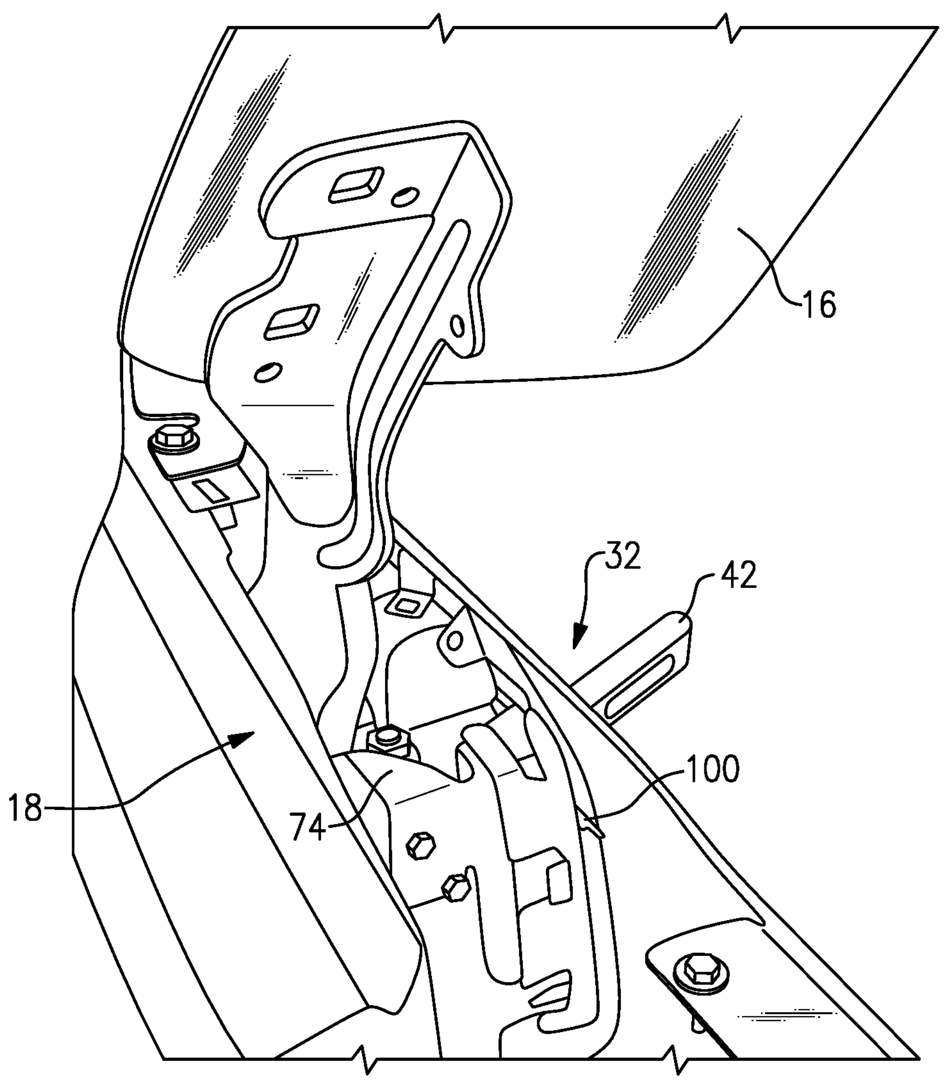
FIG. 6 is a perspective view of an engine compartment within which the fender vent tie down is mounted.

As shown in FIG. 3, the fender vent member 30 comprises a housing 100 having a flange 102 surrounding a recessed area 104 that receives the handle body 42. The flange 102 fits against the exterior surface 36 of the vehicle 10 and a wall portion 106 defines the recessed area 104 that extends inward into a vehicle internal area. The first bracket 52 has a first portion that is pivotally connected to the handle body 42 within the recessed area 104 and portion of the bracket 52 with the second attachment interface 76 protrudes outwardly of the housing 100 and into the vehicle internal area. In one example, the vehicle internal area comprises the engine compartment 18 as shown in FIG. 6.

As shown in FIGS. 4A-4B, the second attachment interface 76 of the bracket 52 extends into the engine compartment 18 to connect to the additional base bracket 74. The base bracket 74 is fixed to the mount structure 88 within the engine compartment 18. In one example, the first opening 90 is aligned with an opening in a hood hinge 110 and the second opening 92 is aligned with an opening in a door hinge 112. The bolts 96 are inserted through the openings 90, 92 and the nuts 98 are secured in place.

The following steps are used to assemble the components together. The handle body 42, the bearing 68, the pin 50, the bracket 52 and the spring 40 are assembled together as sub-assembly. The sub-assembly is then fit into the recessed area 104 of the housing 100 of the fender vent member 30 such that the portion of the bracket 52 that includes the second attachment interface 76 extends outwardly of the housing 100. Next, the fender vent housing 100 is fit against the vehicle external surface 36 that surrounds a fender vent opening 114 (FIGS. 4A-4B) with the one end of the second bracket 52 extending through the fender vent opening 114 to connect to the base bracket 74 in the engine compartment 18. All of the fasteners 84, 94 are installed through the hood opening. As such, all fasteners 84, 94 associated with the brackets 52, 74 are located within the engine compartment 18 such that the vehicle external surface 36 is free from fasteners at a respective fender vent location. This provides an aesthetic appearance as well as providing an antitheft feature because there are no exposed fasteners on the external surface 36, and the first bracket 52 mounts to the base bracket 74 through a hood opening which means the component cannot be removed from the outside.

To use the tie down feature, the following steps are performed. A tie down member 32, e.g. the handle body 42, is associated with the fender vent member 30 such that the handle body 42 is movable between a use position and a stowed position. The handle body 42 is biased to the stowed position using the resilient member 40. The user then manually moves the handle body with enough force to overcome a biasing force of the resilient member 40 to move the handle body 42 to the use position. A tie member 34 is then installed through the loop portion 46 of the handle body 42 to secure the item 28 to the vehicle 10. When the tie member 34 is removed, the biasing force of the resilient member 40 returns the handle body 42 to the stowed position.

The subject disclosure provides for a tie down feature that is integrated into an existing fender vent area. These fender vent areas are on the sides of the vehicles. This circumvents potential scratching of the paint on the hood 16 as the tie downs 34 no longer will directly touch the hood surface. Additionally, there is no longer a partially obstructed view from a front windshield as there are no longer tie downs 34 extending over the window surface. Further, using the vent areas provides a dedicated and fixed attachment point for consistent and repeatable mounting. The tie down feature also has an anti-theft configuration as all attachments for the mounting structure are located within an internal vehicle compartment that is not accessible to outside personnel.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An apparatus comprising:

at least one fender supported by a vehicle, the at least one fender having a fender opening defined through an exterior surface of the at least one fender, the exterior surface being external to a passenger compartment and a cargo area of the vehicle;

a housing insertable through the fender opening and positioned within the at least one fender, the housing having a flange fitting flush against the exterior surface and surrounding the fender opening, and wherein the housing includes side walls defining a recessed area accessible through the fender opening;

a tie down member received within the recessed area of the housing, wherein the tie down member is movable between a use position in which the tie down member extends outwardly through the fender opening and a stowed position in which the tie down member is flush with the exterior surface of the at least one fender;

at least one resilient member to bias the tie down member to the stowed position; and at least one bracket that attaches the tie down member to an internal vehicle mount structure that is within an engine compartment with one or more fasteners wherein the at least one resilient member reacts between the tie down member and the at least one bracket, and wherein all fasteners associated with the at least one bracket are located within the engine compartment such that the exterior surface of the at least one fender is free from fasteners at the housing.

2. The apparatus of claim 1, wherein the at least one bracket comprises at least a first bracket that is fixed to the internal vehicle mount structure and a second bracket that is attached to the first bracket at a first attachment interface and to the tie down member at a second attachment interface.

3. The apparatus of claim 2, wherein the first attachment interface and the second attachment interface are independent of each other.

4. The apparatus of claim 3, wherein the first attachment interface comprises a fixed interface and the second attachment interface comprises a pivot attachment interface, and wherein the fixed interface comprises:

a first plate body of the first bracket with one or more first openings;

a second plate body of the second bracket with one or more second openings; and one or more fasteners that are inserted through the one or more first openings and the one or more second openings when they are aligned with each other.

5. The apparatus of claim 1, including at least one bracket that couples the tie down member to a fixed structure within the engine compartment, and wherein the at least one bracket has a first end that is pivotally connected to the tie down member within the recessed area and a second end that protrudes outwardly of the housing and into the engine compartment, and wherein the second end is fixed to a hood hinge and a door hinge.

6. The apparatus of claim 1, wherein the tie down member comprises a handle body having at least one open area forming a loop portion that is configured to receive a tie member used to attach an item to the vehicle.

7. The apparatus of claim 1, wherein the at least one fender comprises a fender vent.

8. A method comprising:

providing at least one fender on a vehicle, the at least one fender having a fender opening defined through an exterior surface of the at least one fender, the exterior surface being external to a passenger compartment and a cargo area of the vehicle;

inserting a housing through the fender opening and positioning the housing within the at least one fender, the housing having a flange fitting flush against the exterior surface and surrounding the fender opening, and wherein the housing includes side walls defining a recessed area accessible through the fender opening;

positioning a tie down member within the recessed area of the housing such that the tie down member is movable between a use position in which the tie down member extends outwardly through the fender opening and a stowed position in which the tie down member is flush with the exterior surface of the at least one fender;

biasing the tie down member to the stowed position with at least one resilient member;

attaching the tie down member to an internal vehicle mount structure that is within an engine compartment with at least one bracket and with one or more fasteners, and wherein all fasteners associated with the at least one bracket are located within the engine compartment such that the exterior surface of the at least one fender is free from fasteners at the housing; and reacting the at least one resilient member between the tie down member and the at least one bracket.

9. The method of claim 8, including overcoming a biasing force to move the tie down member to the use position.

10. The method of claim 9, including tying a tie member to a loop portion of the tie down member to secure an item to the vehicle.

11. The method of claim 8, including fixing the tie down member to the vehicle with the at least one bracket, the at least one bracket having one end fixed to an internal vehicle structure and an opposite end pivotally connected to the tie down member.

12. A method comprising:

forming a fender opening in an external surface of a fender, the external surface being external to a passenger compartment and a cargo area of a vehicle;

inserting a housing through the fender opening and positioning the housing within the fender, the housing having a flange fitting flush against the external surface and surrounding the fender opening, and wherein the housing includes side walls defining a recessed area accessible through the fender opening;

fixing at least a first bracket to a mount structure within an engine compartment of a vehicle with one or more fasteners;

pivotally coupling a tie down member to a second bracket to form a sub-assembly with one or more fasteners, the tie down member having a handle body with at least one loop portion;

installing at least one resilient member as part of the sub-assembly, such that the at least one resilient member reacts between the tie down member and the second bracket to bias the tie down member to a stowed position;

inserting the sub-assembly into the housing such that the tie down member faces an external environment of the vehicle and one end of the second bracket extends through the fender opening and connects to the first bracket within the engine compartment; and fitting the housing against the external surface of the fender such that a flange of the housing surrounds the fender opening and such that the tie down member is moveable between a use position in which the tie down member extends outwardly through the fender opening and a stowed position in which the tie down member is flush with the external surface of the fender.

13. The method of claim 12, including biasing the tie down member to a stowed position via the at least one resilient member.

14. The method of claim 12, wherein all fasteners associated with the first bracket and the second bracket are located within the engine compartment such that the external surface is free from fasteners at a respective fender location.

15. The method of claim 12, wherein the housing comprises a fender vent, fender badge, fender side plastic component, or fender molding that receives the sub-assembly.

16. The method of claim 8, wherein the housing comprises a fender vent, fender badge, fender side plastic component, or fender molding that receives the tie down member.

17. The apparatus of claim 1, wherein the housing comprises a fender vent, fender badge, fender side plastic component, or fender molding that receives the tie down member.

18. The apparatus of claim 1, wherein:

the tie down member comprises a handle body and at least one loop portion;

the at least one bracket includes a base plate with an arm; and the at least one resilient member reacts directly between the arm and the handle body.

19. The apparatus of claim 2, wherein:

the first bracket comprises a first plate comprising a first mount interface;

the second bracket comprises a second plate comprising a second mount interface; and the first mount interface and the second mount interface directly overlap each other to provide the first attachment interface.

20. The apparatus of claim 19, wherein the second bracket includes an arm extending away from the second plate, the tie down member includes a handle body that is pivotally attached to the arm to provide the second attachment interface.

21. The method of claim 8, including:

forming the tie down member to comprise a handle body and at least one loop portion;

forming the at least one bracket to comprise a base plate with an arm; and reacting the at least one resilient member directly between the arm and the handle body.

22. The method of claim 12, wherein the first bracket comprises a first plate comprising a first mount interface with one or more first openings and the second bracket comprises a second plate comprising a second mount interface with one or more second openings, and including:

directly overlapping the first mount interface and the second mount interface;

aligning the one or more first openings with the one or more second openings; and inserting one or more fasteners that through the one or more first openings and the one or more second openings when they are aligned with each other.

* * * * *